(12) United States Patent
Song et al.

(10) Patent No.: US 8,965,415 B2
(45) Date of Patent: Feb. 24, 2015

(54) SHORT PACKET DATA SERVICE

(75) Inventors: Bongyong Song, San Diego, CA (US);
 Soumya Das, San Diego, CA (US);
 Ramachandran Subramanian, San Diego, CA (US); Miguel Griot, San Diego, CA (US); Stephen William Edge, Esondido, CA (US); Samir Salib Soliman, San Diego, CA (US); Osok Song, San Diego, CA (US); Yih-Hao Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 589 days.

(21) Appl. No.: 13/288,718

(22) Filed: Nov. 3, 2011

(65) Prior Publication Data
 US 2013/0017779 A1 Jan. 17, 2013

Related U.S. Application Data

(60) Provisional application No. 61/508,527, filed on Jul. 15, 2011.

(51) Int. Cl.
 *H04M 1/00* (2006.01)
 *H04W 4/20* (2009.01)
 *H04W 76/00* (2009.01)
 (Continued)

(52) U.S. Cl.
 CPC .............. *H04W 4/20* (2013.01); *H04W 76/005* (2013.01); *H04W 4/12* (2013.01); *H04W 76/022* (2013.01)
 USPC ........... 455/464; 455/466; 455/509; 455/103; 370/328

(58) Field of Classification Search
 USPC ........... 455/464, 466, 509, 103, 179.1, 199.1; 370/328, 329, 331
 See application file for complete search history.

(56) References Cited

U.S. PATENT DOCUMENTS

| 7,193,966 B2 | 3/2007 | Gupta et al. |
| 7,471,654 B2 | 12/2008 | Mueckenheim et al. |
| 8,391,239 B2 | 3/2013 | Tenny et al. |

(Continued)

FOREIGN PATENT DOCUMENTS

| EP | 2416521 A1 | 2/2012 |
| WO | 2008024215 A2 | 2/2008 |

(Continued)

OTHER PUBLICATIONS

3GPP TR 23.888 V1.5.0 (Oct. 2011) 3rd Generation Partnership Project; Technical Specification Group Services and System Aspects; System Improvements for Machine-Type Communications; (Release 11).

(Continued)

*Primary Examiner* — Minh D Dao
(74) *Attorney, Agent, or Firm* — Jeffrey Jacobs

(57) ABSTRACT

A novel message exchange protocol is disclosed. In one example, a method of transmitting data includes generating, with a wireless device, an application data message for an application; evaluating one or more criteria for determining whether to send the application data message via a data radio bearer (DRB) channel or via a signaling radio bearer (SRB) channel that communicatively couples the wireless device to a network resource; and based on determining to send the application data message via the SRB channel, sending the application data message to the network resource via the SRB channel.

82 Claims, 9 Drawing Sheets

(51) Int. Cl.
*H04W 4/12* (2009.01)
*H04W 76/02* (2009.01)

(56) References Cited

U.S. PATENT DOCUMENTS

| | | | |
|---|---|---|---|
| 8,447,304 B2* | 5/2013 | Morinaga et al. | 455/436 |
| 2005/0288062 A1 | 12/2005 | Hammerschmidt et al. | |
| 2007/0189205 A1 | 8/2007 | Terry et al. | |
| 2008/0123660 A1 | 5/2008 | Sammour et al. | |
| 2009/0225711 A1 | 9/2009 | Sammour et al. | |
| 2010/0103862 A1 | 4/2010 | Ulupinar et al. | |
| 2010/0182963 A1 | 7/2010 | Fischer et al. | |
| 2010/0329135 A1 | 12/2010 | Pelletier et al. | |
| 2011/0007671 A1 | 1/2011 | Yu | |
| 2011/0069837 A1* | 3/2011 | Song et al. | 380/270 |
| 2011/0075675 A1 | 3/2011 | Koodli et al. | |
| 2012/0140743 A1* | 6/2012 | Pelletier et al. | 370/335 |
| 2012/0250601 A1 | 10/2012 | Choi et al. | |
| 2012/0307709 A1 | 12/2012 | Ostergaard et al. | |
| 2013/0010620 A1* | 1/2013 | Dinan | 370/252 |
| 2013/0044708 A1 | 2/2013 | Kim et al. | |
| 2013/0051326 A1 | 2/2013 | Jeyatharan et al. | |
| 2013/0100841 A1 | 4/2013 | Liang et al. | |
| 2013/0100895 A1 | 4/2013 | Aghili et al. | |
| 2013/0201924 A1 | 8/2013 | Song et al. | |
| 2013/0242859 A1* | 9/2013 | Celik et al. | 370/328 |
| 2013/0244661 A1* | 9/2013 | Lin et al. | 455/436 |
| 2013/0259003 A1* | 10/2013 | Kwon et al. | 370/331 |
| 2013/0322275 A1* | 12/2013 | Comeau et al. | 370/252 |
| 2013/0322346 A1* | 12/2013 | Comeau et al. | 370/329 |
| 2014/0016598 A1* | 1/2014 | Kwon et al. | 370/329 |
| 2014/0082447 A1* | 3/2014 | Kanamarlapudi et al. | 714/748 |

FOREIGN PATENT DOCUMENTS

| | | |
|---|---|---|
| WO | 2008041816 A1 | 4/2008 |
| WO | 2010028690 A1 | 3/2010 |
| WO | 2010079984 A2 | 7/2010 |
| WO | 2011121580 A2 | 10/2011 |
| WO | 2011135800 A1 | 11/2011 |

OTHER PUBLICATIONS

International Search Report and Written Opinion—PCT/US2012/046809—ISA/EPO—Nov. 22, 2012.

LG Electronics Inc: "Issues in Integrity Protection on DRB", 3GPP DRAFT; R2-106503 Issues in Integrity Protection on DRB, 3rd Generation Partnership Project (3GPP), Mobile Competence Centre; 650, Route Des Lucioles; F-06921 Sophia-Antipolis Cedex; France, vol. RAN WG2, no. Jacksonville, USA; Nov. 15, 2010, Nov. 9, 2010, XP050492304, [retrieved on Nov. 9, 2010] * section 2 *.

* cited by examiner

SHORT PACKET DATA SERVICE

CROSS-REFERENCE TO RELATED APPLICATIONS

This application claims the benefit of priority to U.S. Provisional Application No. 61/508,527, filed Jul. 15, 2011, which is hereby incorporated by reference in its entirety.

TECHNICAL FIELD

This disclosure relates to data transmission involving a wireless network.

BACKGROUND

Wireless devices using 3G technology, such as smartphones and tablet computing devices, are becoming more popular. Many wireless device users install applications that periodically (e.g., every few minutes) send network requests to an application server for updates. Such applications include, for example, social networking applications (such as Facebook, Twitter, and the like), e-mail applications, RSS feeds, and Instant Messaging applications. Wireless devices in a 3G environment (or generally referred to as 3G devices, which may be considered to include any of a variety of "4G", Long Term Evolution (LTE), or other technologies) can send data in a variety of ways. Typically, 3G devices send data related to applications, such as the requests described above, as well as voice, picture, video, and other such data, over a data radio bearer (DRB) channel. 3G devices establish DRB channels by communicating with components of a 3G service provider, such as a mobility management entity (MME) via a signaling radio bearer (SRB) channel.

SUMMARY

In general, this disclosure describes techniques related to wireless device network communication, such as in accordance with the Third Generation Partnership Project (3GPP), for example. More specifically, the techniques of this disclosure are directed to improving 3 G communications involving a wireless device related to low volume activities, such as periodic application updates, which may also be engaged in at relatively high frequencies. Aspects of this disclosure are referred to as a Short Packet Data Service.

In one example, a method of transmitting data includes generating, with a wireless device, an application data message for an application; evaluating one or more criteria for determining whether to send the application data message via a data radio bearer (DRB) channel or via a signaling radio bearer (SRB) channel that communicatively couples the wireless device to a network resource; and based on determining to send the application data message via the SRB channel, sending the application data message to the network resource via the SRB channel.

In another example, a device for transmitting data is configured to: generate, with a wireless device, an application data message for an application; evaluate one or more criteria for determining whether to send the application data message via a data radio bearer (DRB) channel or via a signaling radio bearer (SRB) channel that communicatively couples the wireless device to a network resource; and based on determining to send the application data message via the SRB channel, send the application data message to the network resource via the SRB channel.

In another example, an apparatus for transmitting data includes means for generating, with a wireless device, an application data message for an application; means for evaluating one or more criteria for determining whether to send the application data message via a data radio bearer (DRB) channel or via a signaling radio bearer (SRB) channel that communicatively couples the wireless device to a network resource; and based on determining to send the application data message via the SRB channel, means for sending the application data message to the network resource via the SRB channel.

In another example, a computer program product comprises a computer-readable medium having stored thereon computer-executable instructions that, when executed, cause one or more processors to: generate, with a wireless device, an application data message for an application; evaluate one or more criteria for determining whether to send the application data message via a data radio bearer (DRB) channel or via a signaling radio bearer (SRB) channel that communicatively couples the wireless device to a network resource; and based on determining to send the application data message via the SRB channel, send the application data message to the network resource via the SRB channel.

In another example, a method of transmitting data comprises: receiving, with a network resource, an application data message for an application configured to run on a wireless device; evaluating one or more criteria for determining whether to send the application data message via a data radio bearer (DRB) channel or via a signaling radio bearer (SRB) channel that communicatively couples the network resource to the wireless device; and upon determining to send the application data message via the SRB channel, sending the application data message to the wireless device via the SRB channel.

The details of one or more examples are set forth in the accompanying drawings and the description below. Other features, objects, and advantages will be apparent from the description and drawings, and from the claims.

DETAILED DESCRIPTION

Figure 1:
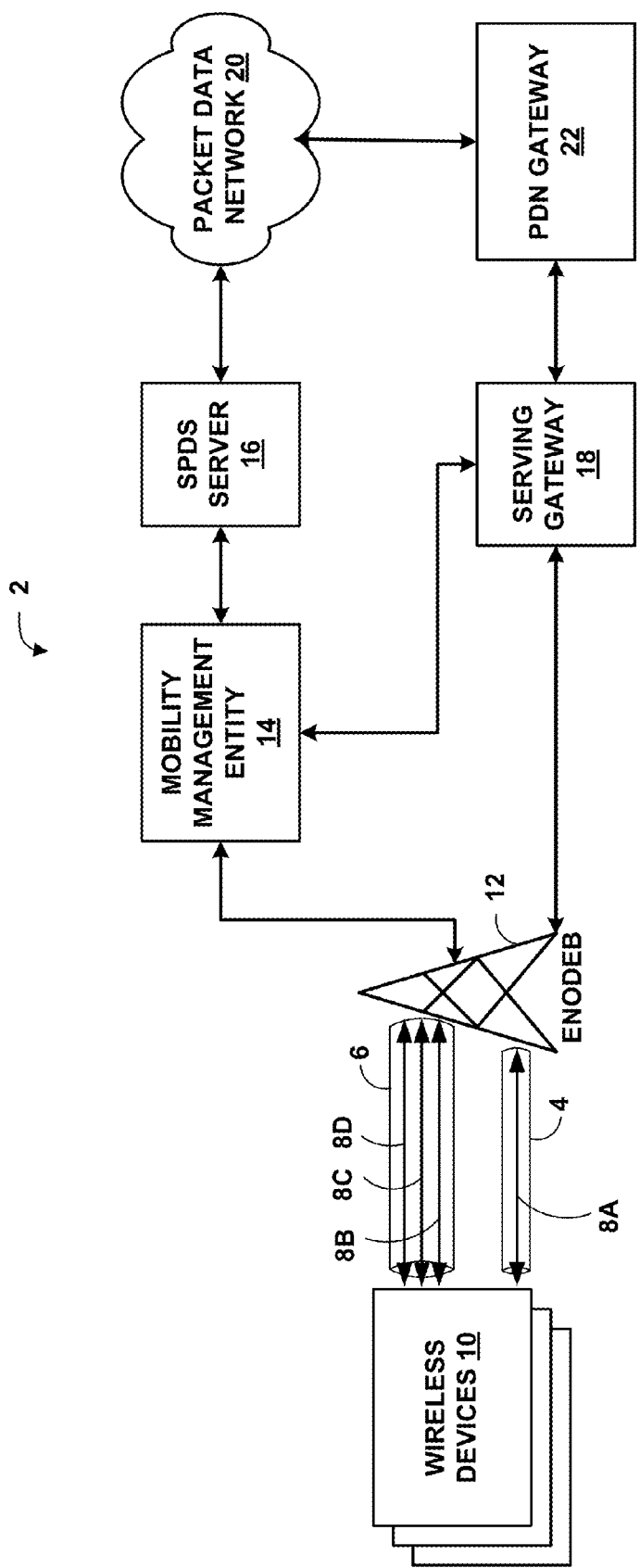
FIG. 1 is a block diagram illustrating an example network system that implements techniques for sending data over a mobile network.

FIG. 1 is a block diagram illustrating an example network system 2 that implements techniques for sending data over a mobile network. Wireless devices 10, e.g., user equipment (UE) devices, can send data in a variety of ways. Channels 4, 6 over which wireless devices 10 send various types of data may be referred to as bearers or bearer channels. Wireless devices 10 may communicate with MME 14 through an Evolved Node B (eNodeB) 12 service tower via a signaling radio bearer (SRB) channel 4 to exchange signaling information and to establish a data radio bearer (DRB) channel 6 when needed to communicate application data. MME 14 may communicate with eNodeB 12 and a serving gateway (S-GW) 18 and facilitate a connection between eNodeB 12 and S-GW 18, and thereby facilitate a connection between a wireless device 10 and a packet data network (PDN) gateway (P-GW) 22. P-GW 22 may be connected to or form a part of a packet data network (PDN) 20, such as the Internet or an enterprise large area network (LAN), for example. Network system 2 also includes Short Packet Data Service (SPDS) server 16, a new type of application server that is described below. Each of the components of network system 2 may be considered herein as a single example or as plural examples, such as a single wireless device 10 or multiple wireless devices 10.

Typically, wireless devices 10 send application data messages 8B, 8C, 8D related to applications, such as network requests, voice, picture, video, and other data, over the DRB channel 6. Many wireless device users install applications that periodically (e.g., every few minutes) send one or more application data packets, such as network requests, to an application server for updates, where the application server may be a P-GW or other device associated with an application. Such applications include, for example, social networking applications (such as Facebook, Twitter, etc.), e-mail applications, RSS feeds, and Instant Messaging applications, among other examples. These applications may be considered "chatty" applications, since they typically send frequent network requests that set up short network sessions and exchange relatively small amounts of data. The effect of such short, low-data, frequent session "chatty" applications is depicted in the graph 40 of FIG. 2. An "application data packet" may be a packet, such as an Internet Protocol (IP) packet, that includes application data for an application, as well as header data that may be used for addressing, transport and other purposes. An IP packet may be wrapped or contained within another packet with additional header data that may be used for addressing, transport and other purposes that apply to any protocol or layer of the Open Systems Interconnection (OSI) model, for example, while the application data in an application data packet may be data for an Application Layer (i.e. OSI Layer Seven) application, for example.

FIG. 1 also depicts an application data message 8A being sent via SRB channel 4. This is further explained below.

Figure 2:
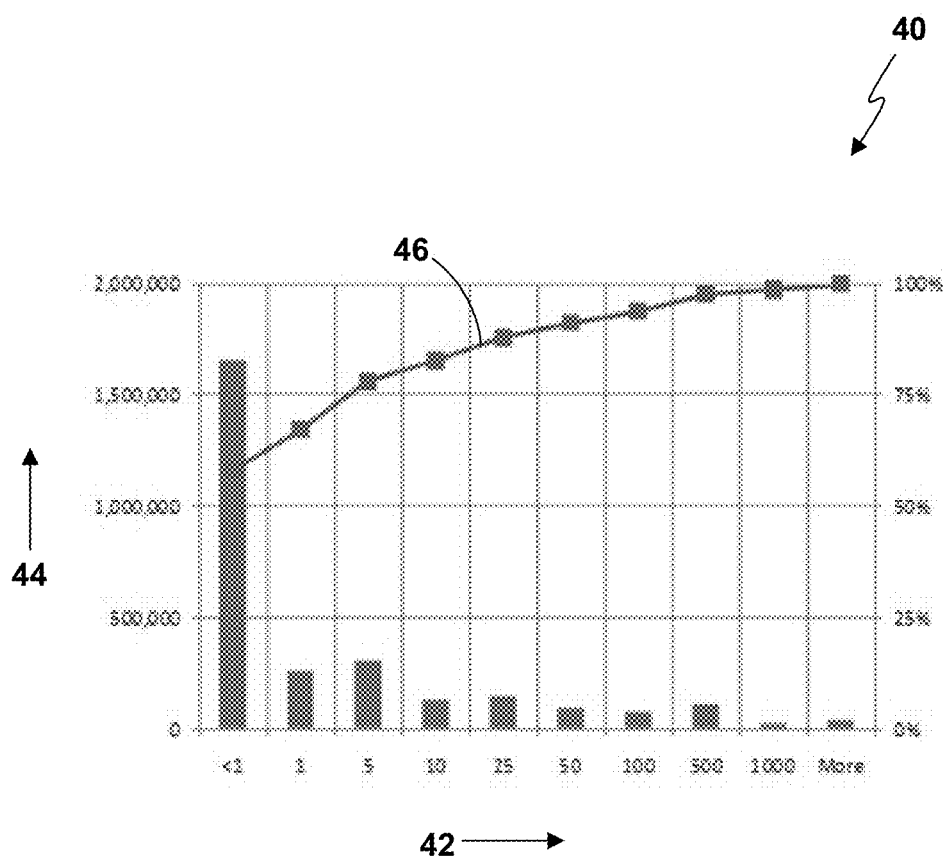
FIG. 2 is a graph indicating certain advantages of techniques disclosed herein.

FIG. 2 shows graph 40 of the amount of data per network session for a set of approximately two and a half million network sessions studied in an empirical survey. X-axis 42 shows data amounts per wireless device network session, in irregularly spaced bins of increasing amounts of kilobytes (kB) of data, including bins for less than one, and up to one, five, ten, 25, 50, 100, 500, 1,000, or more kilobytes. Y-axis 44 shows the number of network sessions studied that fall into each bin for the amount of data downloaded for that session. Cumulative count 46 shows the cumulative percentage (as listed on the right-hand side of the graph) of the sessions included in the bins. This survey showed that, on average, approximately 80% of all network sessions (or generally referred to as calls) for wireless devices transmit less than one kilobyte of data, and approximately 90% of all such network sessions for wireless devices transmit less than 50 kB of data. Network sessions that exchange relatively little data therefore account for a large proportion of all sessions. Each network session conducted over a DRB channel 6 requires its own network communication overhead, which is an increasingly large portion of the total network overhead for a network session for decreasing size of the application data exchanged in the network session. The net effect of the large number of short data messages is to impose signaling overhead out of proportion to the amount of data they carry.

Referring again to FIG. 1, Short Packet Data Service (SPDS) server 16 is introduced in network system 2 and may provide significant advantages in transmitting data, such as application data for short, low-data sessions such as those from "chatty" applications. In various examples, SPDS server 16 may communicate data with MME 14 and with devices of packet data network 20, as shown in FIG. 1. SPDS server 16 may therefore bypass S-GW 18 and P-GW 22 in communicating application data between a wireless device 10 and packet data network 20, which may enable faster communication and low signaling overhead and allow the application data to avoid potential congestion through S-GW 18 and P-GW 22. SPDS server 16 of FIG. 1 is one example of a novel feature disclosed herein that is not part of a conventional 3G service provider network. Various advantageous features of SPDS server 16 are described below.

Figure 3:
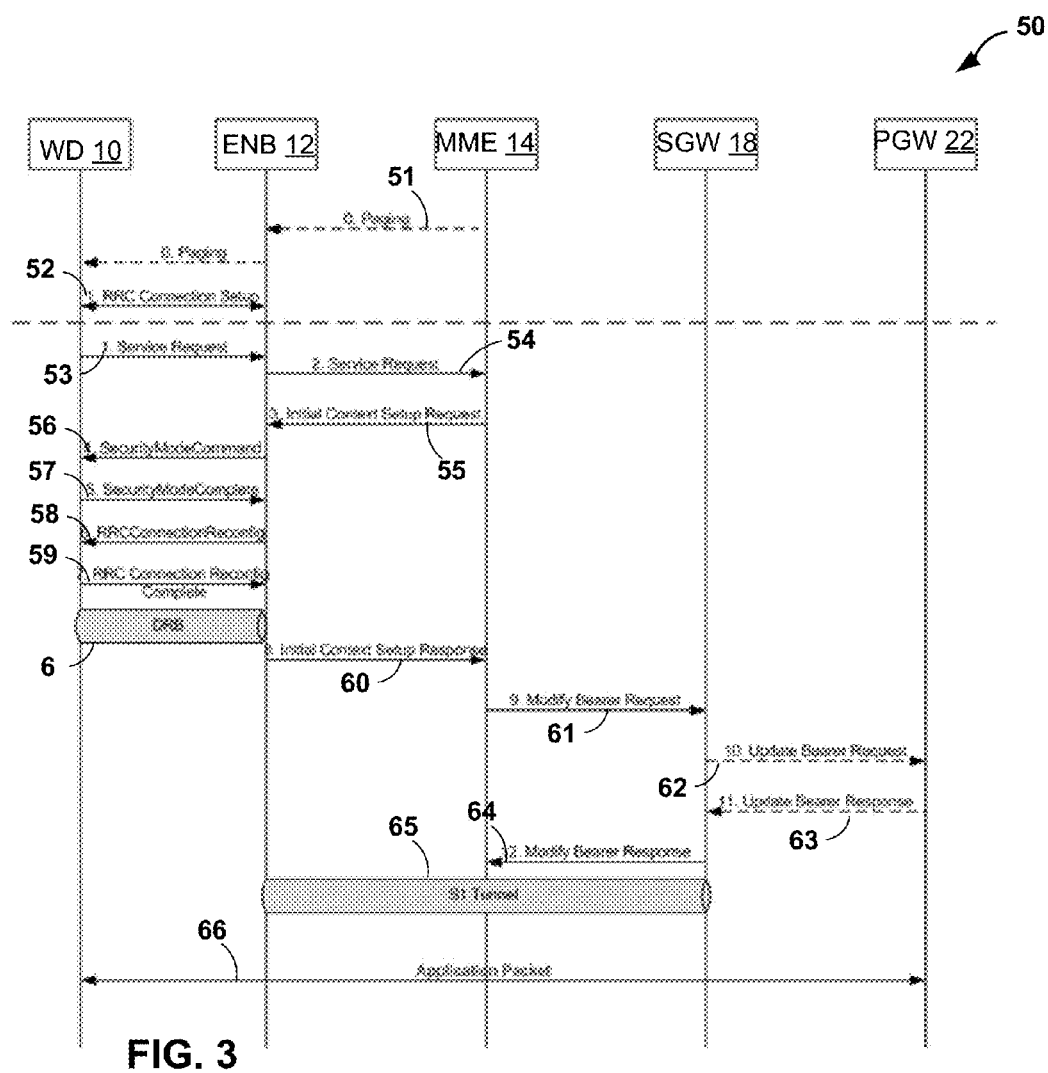
FIG. 3 is a call flow diagram illustrating an example network system for sending data over a mobile network.

FIG. 3 shows a call flow diagram 50 illustrating an example process for establishing a DRB channel without using SPDS server 16. FIG. 3 depicts interactions among wireless devices 10, eNodeB 12, MME 14, S-GW 18, and P-GW 22 of FIG. 1. P-GW 22 in FIG. 3 corresponds to P-GW 22 in the example of FIG. 1 that is connected to the packet data network 20. As can be seen in the example of FIG. 3, there are at least ten steps to initiate a DRB channel using conventional LTE techniques. These include MME 14 sending paging requests 51 to eNodeB 12 and wireless device 10; wireless device 10 and eNodeB 12 setting up a Radio Resource Control (RRC) connection 52; wireless device 10 sending a service request 53 to eNodeB 12 (piggybacked in the RRC Connection Setup Complete message), which sends service request 54 to MME 14; MME 14 sending an initial context setup request 55 to eNodeB 12; eNodeB 12 sending a security mode command 56; wireless device 10 sending a security mode complete 57; eNodeB 12 sending an RRC connection reconfiguration 58 to wireless device 10; wireless device 10 sending an RRC connection reconfiguration complete message 59 to eNodeB 12, thereby initially establishing the DRB channel 6; eNodeB 12 sending an initial context setup request 60 to MME 14; MME 14 sending a modify bearer request 61 to S-GW 18; S-GW 18 updating a bearer request 62 to P-GW 22; P-GW 22 sending an update bearer response 63 to S-GW 18; S-GW 18 sending a modify bearer response 64 to MME 14, thereby initially establishing an S1 user plane interface tunnel 65 between S-GW 18 and eNodeB 12; and then, finally communicating an application data packet 66 through the DRB channel and the S1 interface between wireless device 10 and P-GW 22. In this system of transmitting over a DRB channel without using the SPDS techniques of the present disclosure, even sending a short data transmission, of as little as a single packet, therefore still requires exchanging nine or more signaling messages after an RRC Connection Setup. The S1 Tunnel and the RRC Release add still additional signaling overhead.

Given that over 80% of 3G device traffic is less than 1 kB (per FIG. 2), and that this process must be done for each application of each of wireless devices 10 (in FIG. 1) for each desired application update (which may occur, e.g., every 5, 10, or 30 minutes, for various example applications) if each application update uses a DRB channel, the burden of establishing DRB channels could become quite resource-intensive for components of a 3G network. While these techniques may be advantageous for various types of application data messages and network sessions, including those that transfer relatively large amounts of application data, various example techniques disclosed herein may be particularly advantageous in reducing network overhead for application data messages with relatively small amounts of application data, as further explained below.

Various examples of this disclosure provide a novel mechanism for sending short, low-data network communications via the SRB channel 4, and thus avoid the creation of a more resource-intensive DRB channel for relatively short communications. So, whereas the SRB channel 4 is conventionally used only to exchange signaling information and to help establish a data radio bearer (DRB) channel when needed to communicate application data through the DRB channel, methods of this disclosure instead may send application data messages 8A directly via an SRB channel 4. In various examples, a wireless device 10 may include a filter or other processor or component, that may be implemented in any combination of hardware and software, for evaluating outgoing application data messages and proactively determining, using certain criteria, whether to send these application data messages via the SRB channel 4 instead of creating a DRB channel 6 in which to send the application data.

If the SPDS application knows that communicating with the SPDS server 16 via the SRB channel 4 is more efficient that communicating via DRB channel 6, the application may request the device to send an application packet via the SRB channel 4. Alternatively, the wireless device 10 may evaluate a set of application data to be transmitted under certain criteria, such as a threshold, in making the determination of whether to send it via the SRB channel 4 or via a DRB channel 6. The threshold may be a data size threshold, i.e. a threshold for the amount or volume of data which may be measured in bytes or units based on bytes, for example. The size threshold applied in a given SPDS process may also depend on the type of SRB channel used. Some examples of SRB channels may use signals of 2.2, 3.4, or 13.6 kilobytes, and each of these may have a certain amount of data that is required for the signaling purposes, and a certain amount of data that may be available within which to encapsulate a relatively short application data message. An SPDS size threshold for sending an application data message via an SRB channel rather than a DRB channel may be anywhere in the range of 100 bytes, one kilobyte, ten kilobytes, or any other value that is less than or equal to the amount of spare bandwidth in a given SRB channel, in various examples. In one example, an SPDS system may use a size threshold of 1,500 bytes, a typical maximum size of a single IP packet, and send an application data message via an SRB channel rather than a DRB channel if the application data message is no greater than 1,500 bytes.

In another example, the threshold may be a data transfer rate threshold, i.e. a threshold for the rate or volume per time of data being sent or transferred, which may be measured in bytes or units based on bytes per unites of time, for example. As an illustrative example, an SPDS system may use a data rate threshold of 1 kilobit per second (kbps), though other examples may use rate thresholds in the tens or hundreds of bps or several or tens of kbps, or only a size threshold and no rate threshold, depending on any type of design parameters appropriate for a given system. If wireless device 10 determines to send the data via the SRB channel, wireless device 10 may encapsulate the application data in relatively short application data messages in a specialized message format, referred to herein as a "Short Packet Data Service" or "SPDS" message, that is sent via an SRB channel to a network resource such as an MME 14. An "application data message" may refer herein to one or more application data packets. An "application data flow" may refer herein to any flow comprising application data packets that include data for the same application. An "SRB channel" may refer herein to any signaling channel conventionally used to send signaling data and not application data messages, in various examples.

Aspects of the Short Packet Data Service or "SPDS" as disclosed herein may be implemented in a wireless device 10, in an MME 14, in an SPDS server 16, in another device or resource, or in any combination of these devices, and in any combination of hardware and software in any of these devices. The term "SPDS" by itself may be used herein to refer to any device, method, apparatus, or computer-readable medium software, or associated protocol, that implements any aspect of a Short Packet Data Service or similar functions as described herein.

The SRB channel may serve as a communicative coupling between a wireless device 10 and the MME 14 of network system 2. Conventional MME devices are responsible for handling only signaling messages, but are not responsible for handling any data messages.

Various examples of this disclosure may also include novel kinds of network resources such as MME 14 that are capable of sending and receiving network traffic from (and to) wireless devices 10 and to (and from) devices of packet data network 20. In some examples, the MME 14 may send application data messages to an SPDS server 16, such that the MME 14 and the SPDS server 16 are configured to recognize and process application data packets sent via an SRB channel, and send the application data packets to an application server associated with the application, wherein the application server is accessible via packet data network 20.

P-GW 22 is an example of an application server that is accessible via packet data network 20, i.e. P-GW 22 is communicatively connected with or forms part of packet data network 20. In other examples, MME 14 may communicate with SPDS server 16 through an SPDS gateway (not depicted in FIG. 2). In yet other examples, an MME 14 may include integrated SPDS server functions, in any combination of hardware and software, such that an MME 14 itself is configured to recognize and process application data packets sent via an SRB channel, and send the application data packets to an application server accessible via packet data network 20. This may be referred to as an MME 14 with integrated SPDS functions, or as an SPDS-enabled MME 14. In any of these examples, including with the MME 14 communicating application data messages with packet data network 20 through an SPDS server 16 and/or an SPDS gateway, the MME 14 may be considered to be enabled to communicate the application data message directly to the packet data network 20, in that MME 14 is enabled to bypass the S-GW 18 of the service provider network in communicating the application data message to the packet data network, or to any application server, gateway, or other device that forms part of or is communicatively connected to packet data network 20.

Wireless device 10 may therefore send an application data packet via an SBR channel to a network resource such as an MME that is enabled to communicate the application data message directly to a packet data network 20. The MME may be enabled to communicate the application data message directly to the packet data network 20 by being configured for forwarding application data messages through an SPDS protocol, or by sending the application data message through an application proxy server such as an SPDS server that is configured for forwarding application data messages through a SPDS protocol. Wireless device 10 may also send the application data messages via an SRB channel through intermediate network resources such as eNodeB 12 or another node that connects wireless device 10 with MME 14.

Figure 4:
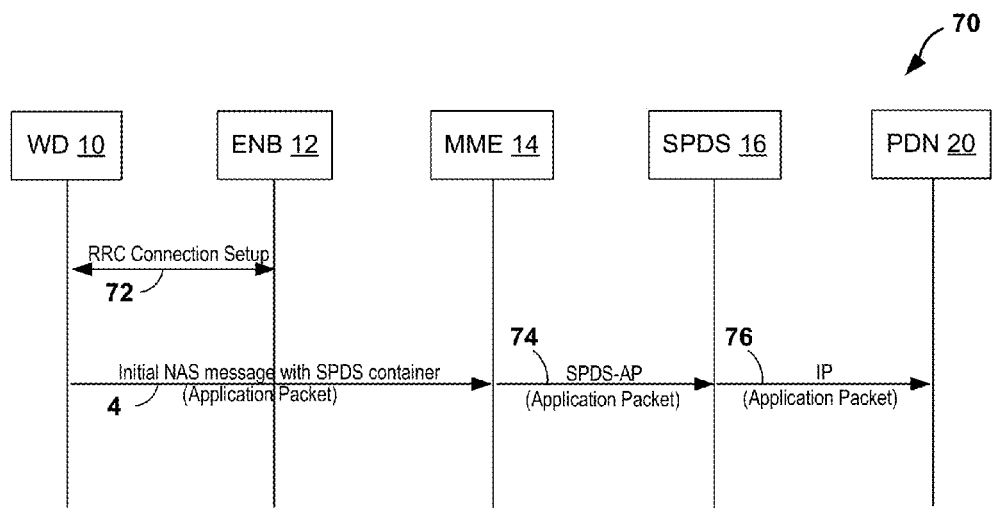
FIG. 4 is a call flow diagram illustrating an example network system that implements techniques for sending mobile originated data over a mobile network.

FIG. 4 shows a call flow diagram 70 that illustrates the operation of network system 2 with MME 14 and SPDS server 16 and that implements an SPDS method, according to one example that may be contrasted with the communication process performed without SPDS as illustrated in FIG. 3. As can be seen in the example of FIG. 4, network system 2 communicates an application data message via an SRB 4, and is able to communicate the application data message with far fewer steps than in the communication process performed without SPDS as illustrated in FIG. 3. Once wireless device 10 and eNodeB 12 set up an RRC connection 72, wireless device 10 is then able to send an application data message via an SRB channel through eNodeB 12, MME 14 and SPDS server 16 to P-GW 22. Further details about this transmission are described below. Sending application data message transmissions over signaling channels using SPDS methods as described herein may therefore ensure faster performance with less signaling overhead than conventional methods.

In an example of a system using SPDS methods, MME 14 may be configured to associate a mobile ID with a connection ID associated with a communication session for a device of packet data network 20, such as P-GW 22. In this manner, a wireless device 10 may provide application data via an SRB channel as an SPDS message, including the mobile ID associated with the wireless device 10 in the SPDS message. An MME 14 working in communication with an SPDS server 16, or an SPDS-enabled MME 14, may establish a communication session with the destination of the application data (e.g., a server, as specified by a destination Internet Protocol (IP) address) and assign the communication session a connection ID. Upon receiving a response that indicates the connection ID, the MME 14 can determine the correct wireless device 10 for which the response is destined based on the association between the mobile ID and the connection ID. In this manner, there may be a one-to-many relationship between mobile IDs and connection IDs, in that each of the wireless devices 10 may create several communication sessions, while each communication session is mapped to exactly one of the wireless devices 10, in this example.

Several different architectures may be used in various examples. One example is depicted in FIG. 4 and is described in further detail as follows. Once wireless device 10 and eNodeB 12 set up an RRC connection 72, wireless device 10 sends application data packets to the MME 14 via an SRB channel using an initial Non-Access Stratum (NAS) message 4 in a new container format, referred to herein as an SPDS message container. In this architecture, the MME 14 may communicate with an SPDS server 16 as illustrated in the example of FIG. 1. The MME 14 and SPDS server 16 may communicate according to a new protocol, referred to as Short Packet Data Service Application Protocol 74, or SPDS-AP, in this example (e.g., to exchange the communication ID explained above). MME 14 may read application data packets sent in NAS transfer signals via an SRB channel 4, and forward the application data packets in SPDS-AP packets 74 to SPDS server 16, which may forward the application data packets in Internet Protocol (IP) packets 76 to the packet data network 20, with the IP packets 76 potentially being routed through intermediate resources of a packet data network 20 between SPDS server 16 and the application server which is the final destination of the packet residing in the packet data network 20.

Figure 8:
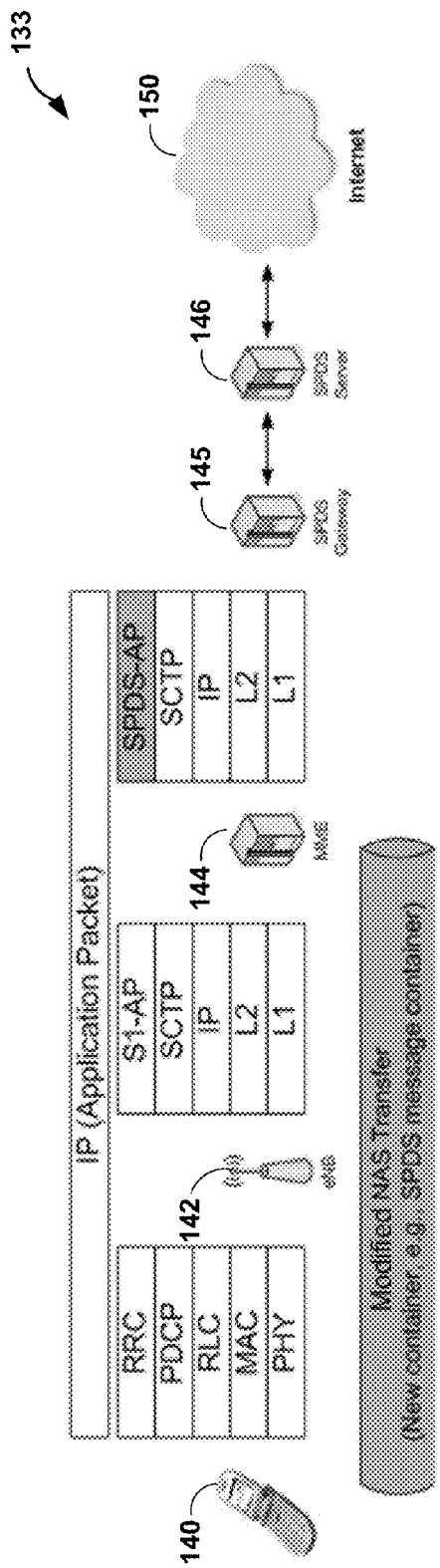
FIG. 8 is a conceptual diagram illustrating an example network system that implements protocol stacks for sending data over a mobile network.

In another example, an MME 14 may communicate with an SPDS gateway (not depicted in FIG. 1) according to SPDS-AP, and the SPDS gateway forwards SPDS data (e.g., in accordance with Internet Protocol (IP), or other protocols in other examples) to an SPDS server that resides outside the service provider network of MME 14. An example of the SPDS gateway is illustrated in FIG. 8, as discussed in greater detail below.

In some examples, a wireless device 10 may include an SPDS channel manager component or SPDS routing manager (not depicted) component to determine whether to send an application data packet via an SRB channel or a DRB channel. This function may be referred to as "SPDS channel management". The SPDS channel manager component may make this determination by comparing the size of the application data packet to a threshold, such as a data size threshold, in an example. If the SPDS channel manager component determines that the size of the application data packet exceeds the threshold, such as having more bytes of data than the threshold, the wireless device may construct a DRB channel and send the packet via the DRB channel, in this example. On the other hand, if the SPDS channel manager component determines that the size of the application data packet is less than the threshold, the wireless device 10 may instead send the application data packet via the SRB to the MME 14, as discussed above.

In another example, an SPDS channel manager component of a wireless device 10 may determine whether the amount of data for an application data flow, including one or more application data packets, exceeds a threshold based on one or more criteria for evaluating an application data flow. In this example, wireless device 10 may evaluate more than a single application data packet for whether to send one or more application data packets via an SRB channel or a DRB channel. Wireless device 10 may apply multiple criteria in evaluating whether to send application data packets via an SRB channel or a DRB channel, such as both the size of individual application data packets and the frequency or number of application data packets, with reference to both size and frequency or number thresholds, in determining whether to send application data packets via an SRB channel or a DRB channel. A wireless device 10 may also use other criteria in determining whether to send an application data packet via an SRB channel or a DRB channel, either alone or in combination with a size criterion, a frequency criterion, or a number criterion, or any combination thereof.

In another example, the SPDS channel manager makes the determination only when the application explicitly requests using an SRB channel. In this example, in the absence of an explicit request from an application, the application packet will be sent via a conventional DRB channel. As an example, the application may request the SPDS channel manager that the application data packet requires an urgent transmission without incurring the DRB setup overhead and delay. A push-to-talk (PTT) application that wants to send a PTT call setup request packet quickly could be an example. When there is an explicit request from an application, the SPDS channel manager makes its own determination based on any one or more of the various criteria described above (e.g. size, frequency, delay sensitivity, etc.).

In another example, the SPDS channel manager makes the switching determination from using a SRB channel to using s DRB channel by constantly monitoring the traffic flow and/or collecting the input from the applications. For a very first short application data packet, it may decide to use an SRB channel. As the overall traffic volume increases, it may decide to establish a DRB channel which is more efficient to handle larger volume traffic. In another example, the application may explicitly request the switching. The PTT application which initially requested an SRB channel may request switching to a DRB channel once the PTT call is successfully established. Once the SPDS channel manager decides to switch to a DRB channel, the wireless device 10 may start the traditional service request procedure depicted in FIG. 3 to bring up one or more DRBs.

Figure 5:
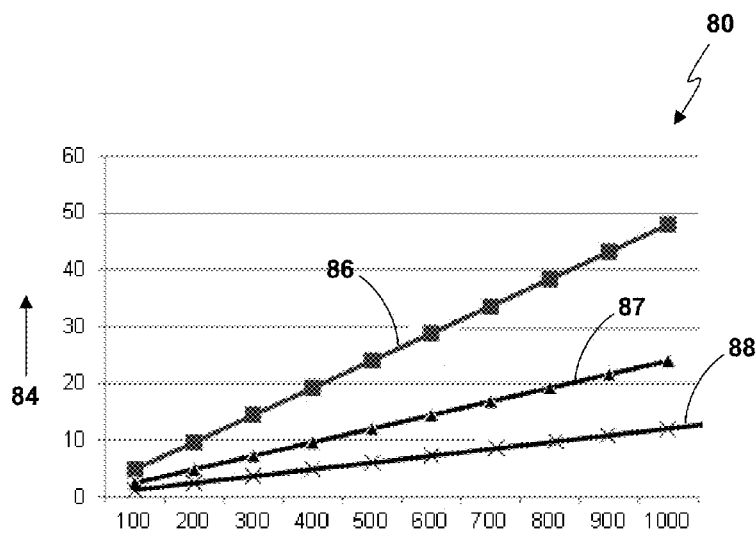
FIG. 5 is a graph illustrating indicating certain advantages of techniques disclosed herein.

FIG. 5 depicts graph 80 that illustrates various example advantages of implementing example SPDS techniques as disclosed herein. In one example implementation, using Signaling Reduction Analysis based on SPDS channel management, it was found that for each application data message sent via an SRB channel rather than by a traditional DRB channel, eight signaling messages between various network components may be saved. This reflects the large number of signaling messages typically exchanged to set up and manage a transmission via a DRB channel, and the signaling overhead that is avoided by sending application data messages via an SRB channel instead of using SRB signaling messages to set up a DRB channel to send the application data messages through.

In the example depicted in graph 80 in FIG. 5, using SPDS channel management, 50% of all application data messages from wireless devices 10 connected to one MME 14 are sent via an SRB channel instead of a DRB channel. FIG. 5 illustrates the number of signaling messages reduced per hour, if short application data messages are sent at intervals of five minutes, ten minutes, and thirty minutes, as the number of wireless devices for each MME ranges from one hundred thousand to one million.

The number of wireless devices communicating with one MME is depicted along x-axis 82, in units of thousands of wireless devices, so that the x-axis ranges from 100,000 to one million wireless devices. The reduction in the number of signaling messages, i.e. the number of signaling messages that are avoided, by sending 50% of all application data messages via an SRB channel instead of via a DRB channel, is depicted along the y-axis 84, in units of millions per hour, so that the y-axis ranges from 0 to 60 million signaling messages per hour. The reduction in the number of signaling messages per hour if short application data messages are sent at intervals of five minutes is shown in plot 86; the reduction in the number of signaling messages per hour if short application data messages are sent at intervals of ten minutes is shown in plot 87; and the reduction in the number of signaling messages per hour if short application data messages are sent at intervals of thirty minutes is shown in plot 88. Sending some application data messages via an SRB channel may therefore substantially reduce overall network signaling overhead.

Figure 6:
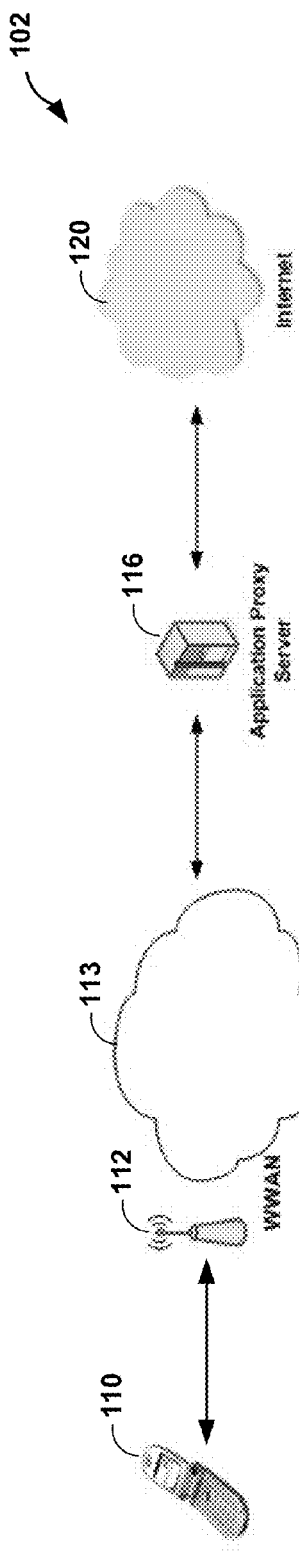
FIG. 6 is a block diagram illustrating an example network system that implements techniques for sending data over a mobile network.

FIG. 6 shows a broad outline of an architecture for a network system 102 according to another illustrative example. An application proxy server 116, which may be an SPDS server, may communicate with a packet data network 120 such as the Internet. The application proxy server 116 may periodically update application data on behalf of the terminal. Applications running on the wireless device 110 may periodically check any updates with the application proxy server 116, using a Mobile Originated (MO) connection. The proxy server 116 may notify updates to the wireless device 110 in either a scheduled or on-demand manner, using a Mobile Terminated (MT) connection. Application proxy server 116 may communicate with an MME (not individually depicted) in access network 113, and wireless device 110 may communicate with application proxy server 116 via a node 112 and the MME in access network 113. A user plane connection, such as a DRB channel and an S1 user plane interface tunnel, as depicted in FIG. 3, is not needed in this case. The wireless device 110 and the MME in access network 113 may send application data packets and otherwise communicate with each other via an SRB channel that comprises using NAS messages with a SPDS container (e.g., modified UL/DL generic NAS Transfer messages that have an SPDS container). This DRB-less SRB channel scheme may also be used for Control Plane Location Service (C-plane LCS), for example.

New SPDS message container types may be defined in various examples. Container contents may be up to 65,535 bytes (i.e. $2^{16}-1$ bytes; see 3GPP Technical Specification 24.301), in various examples. Application data messages sent via an SPDS message container may be able to handle over 80% to 90% or more of the application data messages from wireless devices 110, as described above with reference to network system 2. New application protocols such as SPDS-AP may be defined and used for communication of application data messages between an MME in access network 113 and SPDS server such as application proxy server 116, in the example of FIG. 6.

Figure 7:
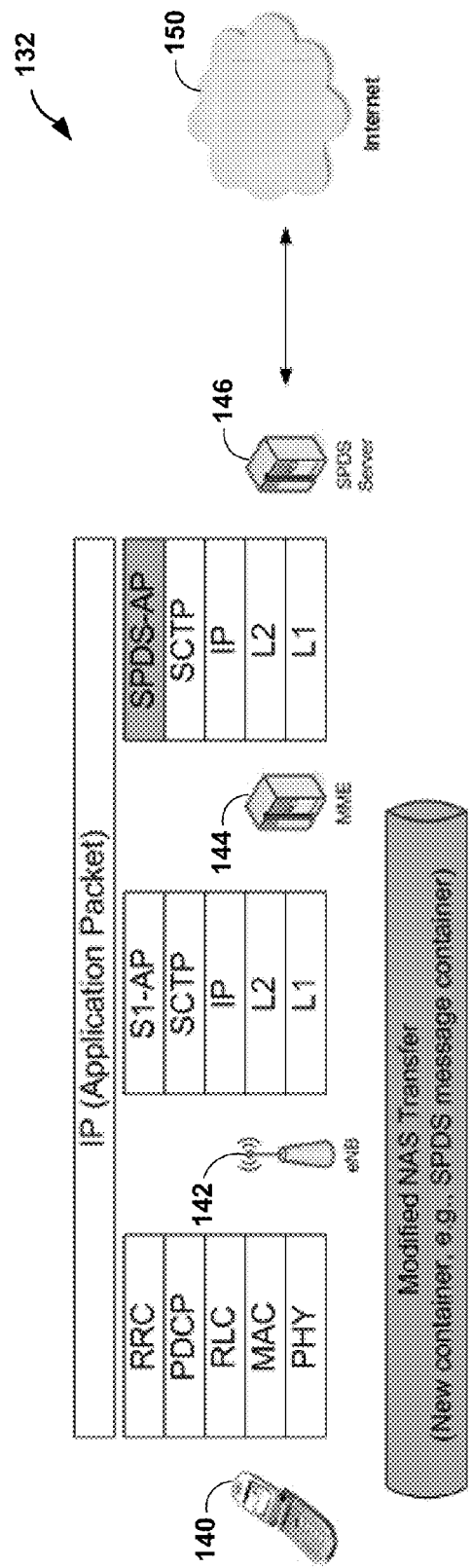
FIG. 7 is a conceptual diagram illustrating an example network system that implements protocol stacks for sending data over a mobile network.

FIG. 7 depicts a conceptual diagram that includes a block diagram of an example architecture of a network system 132 in accordance with an illustrative example in which a wireless device 140 and an MME 144 may communicate via an SRB channel via modified NAS transfer through a new container type, such as an SPDS message container. The MME 144 and SPDS Server 146 may exchange data in SPDS Application Protocol (SPDS-AP) in this example. Network system 132 provides an efficient connection between wireless device 140 and MME 144, including via eNodeB 142. Network system 132 provides another efficient connection between MME 144 and an application proxy server, in this example SPDS server 146. Network system 132 enables application data transfer without using a DRB, with SPDS-AP used as the protocol between the MME 144 and the SPDS server 146. The MME 144 may maintain a mapping table between mobile IDs and connection IDs, and maintains an association between the mobile IDs and the connection IDs to packet data network 150 such as the Internet or an enterprise LAN. The SPDS server 146 may maintain this mapping also. As noted above, another example may feature an SPDS gateway (not depicted in FIG. 7) in direct communication with the MME 144, and that relays communications to an SPDS server 146 that resides outside the service provider network in which MME 144 resides.

In some examples, SRB channels may have some limitations in that they have higher priority than DRB channels. Using an SRB path for short data communications may increase the amount of SRB utilization. Generic NAS has a payload limit of 65,535 bytes. Usage of SPDS management may therefore be regulated so that short data transmissions over an SRB channel don't, for instance, interfere with the standard signaling transmissions over the SRB channel. For example, the wireless device 140 may evaluate whether a combined application data message is less than or greater than a selected threshold, such as a data size threshold of 1500 bytes, for example, and if the size is above the threshold, it sends the application data message by the DRB channel rather than the SRB channel. Additionally, even if individual data packets are smaller than the threshold, the wireless device 140 may evaluate whether a cumulative application data flow volume might exceed a nominal transfer rate threshold. If the cumulative volume of application data flow exceeds this transfer rate threshold, the wireless device 140 may opt to send only some of the application data flow over an SRB channel and to send the remaining application data flow over a DRB channel, in this example of an SPDS management method.

In order to avoid short data transmissions over an SRB channel from interfering with the standard signaling transmissions over the SRB channel, the wireless device 140 may explicitly indicate its intent to use the SRB channel for transmitting short data packets during the RRC connection setup 52. The establishment cause in the RRC connection request could be "data over SRB". In this case, the eNodeB 142 can accept or reject the request based on the current signaling load or overall load of the eNodeB 142.

The SPDS Server 146 or SPDS gateway (not depicted in FIG. 7) may determine whether to send packets of an application data message to the MME 144 or to a PDN gateway accessible through packet data network 150, and may evaluate packet size or cumulative data flow volume. Packet filters may be defined for an IP address and port number. If the data size of an application data message for the same IP address and port number exceeds a threshold, as determined by an SPDS filter or other SPDS logic component or module, then the application data message may be sent via a DRB, otherwise it may be sent via an SRB.

FIG. 8 depicts a network system 133 with a similar architecture as FIG. 7 but with an SPDS gateway 145 receiving data and communicating with an SPDS server 146. An SPDS gateway 145 may reside in a given service provider network and be useful for placing the SPDS server 146 outside the service provider network. The SPDS gateway 145 may communicate via SPDS-AP with the MME 144 and communicate via either SPDS-AP or Internet Protocol (IP), in different implementations, with the SPDS server 146. The SPDS gateway 145 may maintain a tunnel, such as a user plane interface tunnel, with the SPDS server 146, such as with IP in IP. The SPDS gateway 145 may apply an operator-defined routing policy to route packets of an application data message to either the MME 144 or a P-GW accessible via packet data network 150. The SPDS gateway 145 may physically co-exist with the SPDS server 146, or the SPDS server 146 may be situated remotely from the SPDS gateway 145, in different examples. Wireless devices 140 communicate with MME 144 via eNodeB 142.

A new call flow may also be defined, with Mobile Originated (MO) PS call flow. The MO call flow is greatly simplified compared to the call flow requiring a Service Request procedure, and much simpler than the call flow depicted in FIG. 3.

An application layer aggregator application, executed by wireless devices 10, may interact with a short packet channel manager or routing manager. The aggregator application may aggregate application data message from among two or more "chatty" applications, such as social networking applications, email applications, and other applications with short, frequent pushes or updates, into a single, aggregated application data message. The single, aggregated application data message may be composed in the form of as little as a single application data packet, for example, with a single header containing aggregated application data for each of two or more aggregated applications. The aggregated application data packet may include an SPDS application header that may include information on the aggregated application data messages contained within the packet. The aggregated application data message may comprise any other number of packets in other examples.

The aggregated application data message may be sent via an SRB channel, and provide for pushes or updates for two or more chatty applications with a single, SRB-carried application data flow. Each of the applications subject to the aggregated application data message wake up at the same time and get an update at the same time. The aggregator application may implement very frequent or constant checks for updates to monitor all possible social network, email, or other chatty applications. The aggregator applications may run on wireless device 140 and send SPDS messages to an application proxy server, such as SPDS server 146, for example. The wireless device 140 may use an SPDS management filter component, implemented in any combination of hardware and software, and apply an SPDS determination method, including comparison with any type or combination of thresholds, of whether to send the aggregated application data message via an SRB channel or via a DRB channel.

In some implementations, a wireless device 140 may allow only a subset of applications to use the SPDS process. This may also be implemented in the SPDS filter or routing management component, according to a routing policy defined that may be defined by the operator. The SPDS filter or routing management component may also evaluate whether a packet size or cumulative data volume of an application data message or application data flow are less than a selected threshold to forward the application data message or application data flow via an SRB channel or a DRB channel. In another example solution, a routing manager may allow any application to use the SPDS process without a proxy. No change may be made to existing proxy servers.

Figure 9:
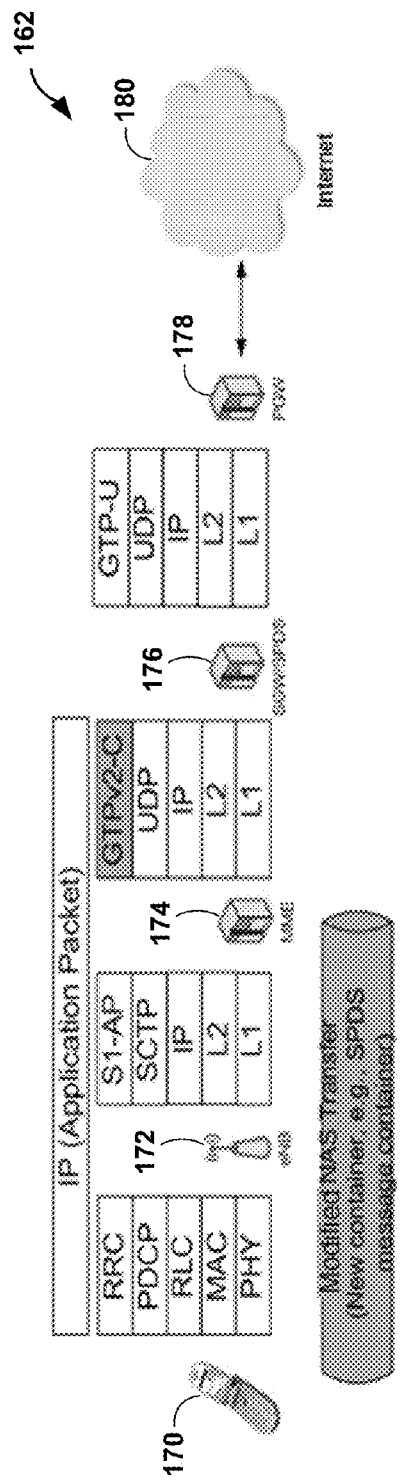
FIG. 9 is a conceptual diagram illustrating an example network system that implements protocol stacks for sending data over a mobile network.

FIG. 9 depicts a schematic for an example architecture for a network system 162 that includes an SPDS serving gateway (S-GW) 176, and in which the MME 174 and SPDS S-GW 176 exchange SPDS messages as GTPv2-C messages. The S-GW 176 is enhanced for SPDS methods so as to selectively use a generic NAS transfer route to send SPDS-qualifying application data messages, i.e. application data messages that an SPDS management component determines qualify to send via an SRB, such as short application data packets. The S-GW 176 may use the usual S1 Tunnel and DRB channel for sending other, non-SPDS-qualifying application data messages. Certain application data messages such as short packets may be sent to MME 174 as a GTPv2-C message to use a generic NAS transfer route. DL data notification messages may use the S1 tunnel route.

S-GW 176 or MME 174 may be enhanced with SPDS functionality. An S5 tunnel may be used without establishing a DRB and an S1 tunnel. A wireless device 170 may communicate with the S-GW 176 via eNodeB 172 and MME 174 for SPDS-qualifying application data messages. An SPDS-qualifying application data message may be treated as a message on GTPv2-C for communications between MME 174 and SPDS S-GW 176, as depicted in the call flow of FIG. 10.

Figure 10:
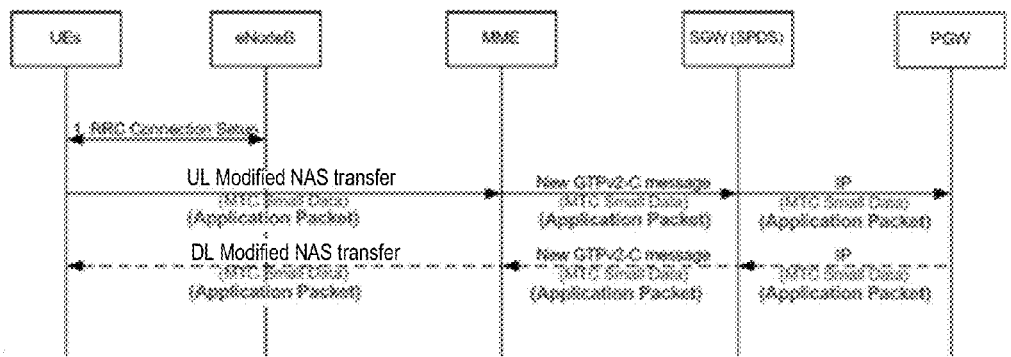
FIG. 10 is a call flow diagram illustrating an example network system that implements techniques for sending mobile originated data over a mobile network.

FIG. 10 shows an example of a mobile originated (MO) PS call flow, such as may be used by network system 162 of FIG. 9. The MO call flow is greatly simplified compared to the call flow requiring a Service Request procedure. The call flow includes wireless device 170 and eNodeB 172 setting up an RRC connection; wireless device 170 sending or uploading an application data message via an SRB channel through an initial NAS message (for example, a modified NAS transfer) through eNodeB 172 to MME 174; MME 174 sending the application data message in a GTPv2-C message to SPDS-enabled S-GW 176; and S-GW 176 sending the application data message in one or more IP packets to P-GW 178. This call flow may be reversed for application data messages being sent back from P-GW 178 to wireless device 170. The application data messages may include any type of application packets. In one example, the application data messages may include Machine Type Communication (MTC) Small Data application data messages, for Machine to Machine (M2M) communications, which is another example of a class of applications that may employ short, frequent application data messages that may be well suited for packaging and sending in an SRB in an SPDS data management method.

In one example for a Mobile Terminated (MT) call issue, there is a need for MME 174 to tell wireless device 170 whether the paging is for an SPDS method. In one example, a paging cause may be added to a Page message, and MME 174 may be enabled to tell wireless device 170 whether the paging is for an SPDS method. This may provide additional benefits for other existing services requiring only SRB channels. Control Plane LCS and MT SMS do not need to bring up unused DRB channels due to standard limitations. The Service Request overhead may be eliminated.

Figure 11:
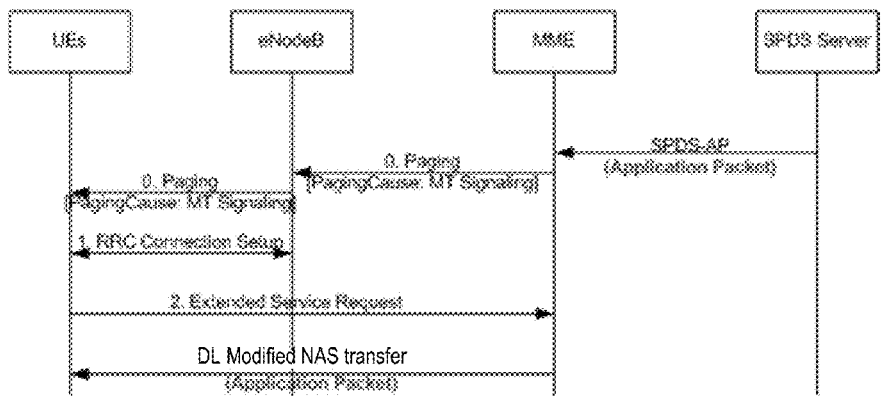
FIG. 11 is a call flow diagram illustrating an example network system that implements techniques for sending mobile terminated data over a mobile network.
Figure 12:
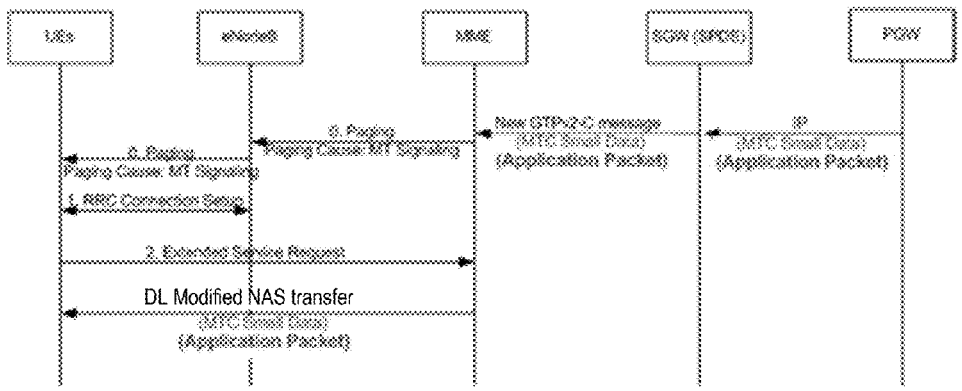
FIG. 12 is a call flow diagram illustrating an example network system that implements techniques for sending mobile terminated data over a mobile network.

FIG. 11 depicts a new call flow for a Mobile Terminated (MT) PS call. A wireless device paging triggers a Service Request procedure. Various optimizations may be enabled for this MT example. A paging cause may be added to indicate MT signaling, in a paging call from the MME to the eNodeB to the wireless device. The wireless device may respond with an Extended Service Request. FIG. 12 depicts an MT PS call flow for an example solution, that may originate with an application data message from a P-GW to an SPDS-enabled S-GW to an MME, prior to a paging call from the MME to the eNodeB to the wireless device, where the paging call includes an MT signaling paging cause. This is followed by the wireless device sending the Extended Service Request via the eNodeB to the MME, and the MME responding by sending the application data message via an SRB, in the form of a generic NAS transfer message, via the eNodeB to the wireless device. In this example also, this application data message may be any application data message that may be handled with an SPDS process, and may include an MTC small data message.

Figure 13:
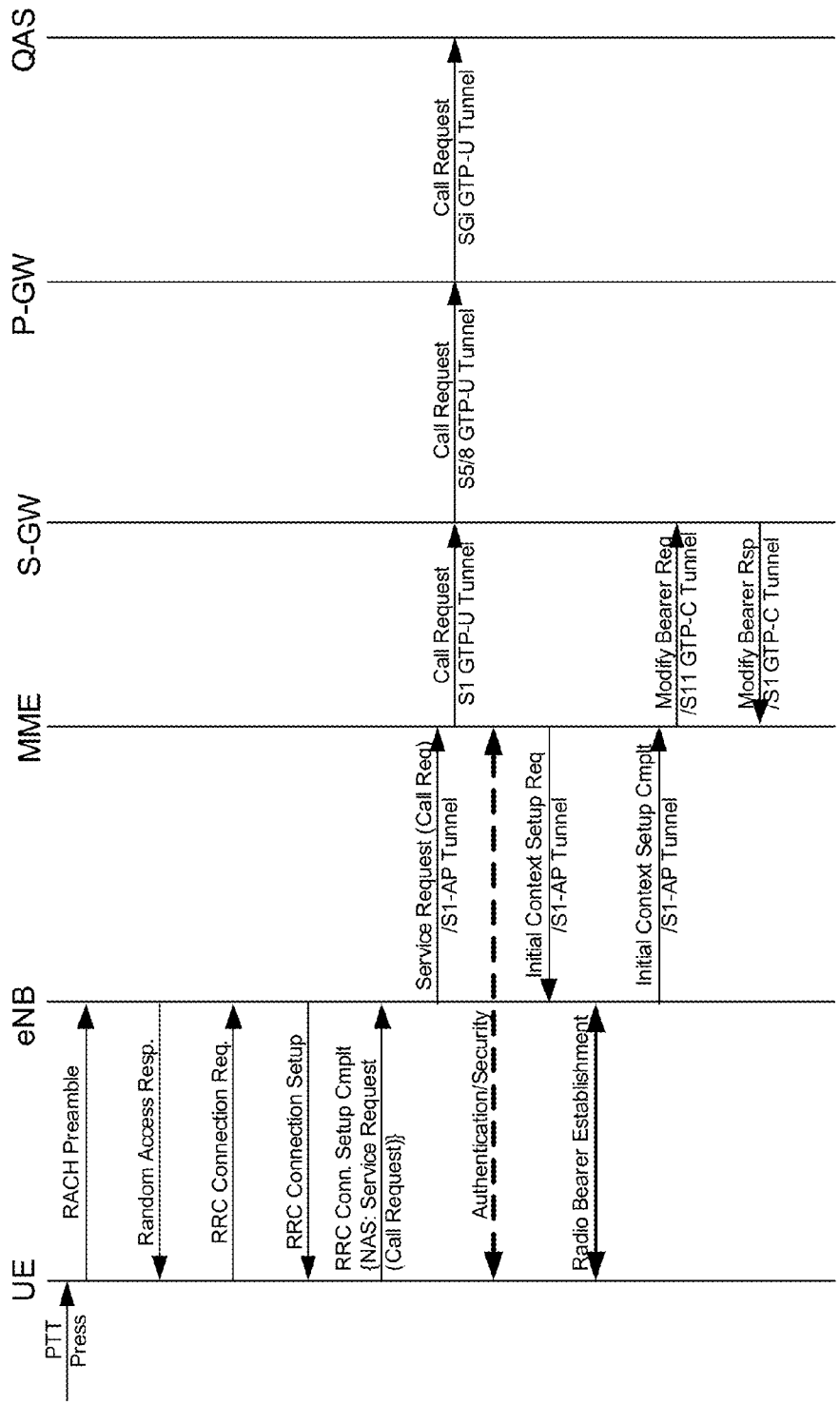
FIG. 13 is a call flow diagram illustrating an example network system that implements techniques for sending mobile originated data over a mobile network for push-to-talk (PTT) call setup.

FIG. 13 depicts a call flow for another example, in which a PTT Call Request may be sent over NAS signaling in a system based on LTE. In this example, a wireless device may piggyback an initial user IP application data packet (PTT Call Request) in a modified NAS message (e.g., a modified Service Request (SR) message or a modified Extended Service Request message), which is modified to have a container for an application data message. After receiving the SR message, an MME may extract the piggybacked user IP packet and forward the packet to the S-GW based on the S-GW address and the S1 Tunnel Endpoint Identifier (S1-TEID). In this example, the wireless device may start transmitting user plan data along with the RRC Connection Setup Complete. The SRB channel procedure may not block the uplink transmission after the establishment of the RRC connection. The initial user plan application data message may be encapsulated in the SR message, which in turn may be encapsulated into the RRC Connection Setup Complete. The application data message may therefore be encapsulated in an SRB channel message in the following format: RRC Connection Setup Complete {NAS: Service Request (Initial User Plan Data-)}. This is illustrated in the call flow in FIG. 13.

Figure 14:
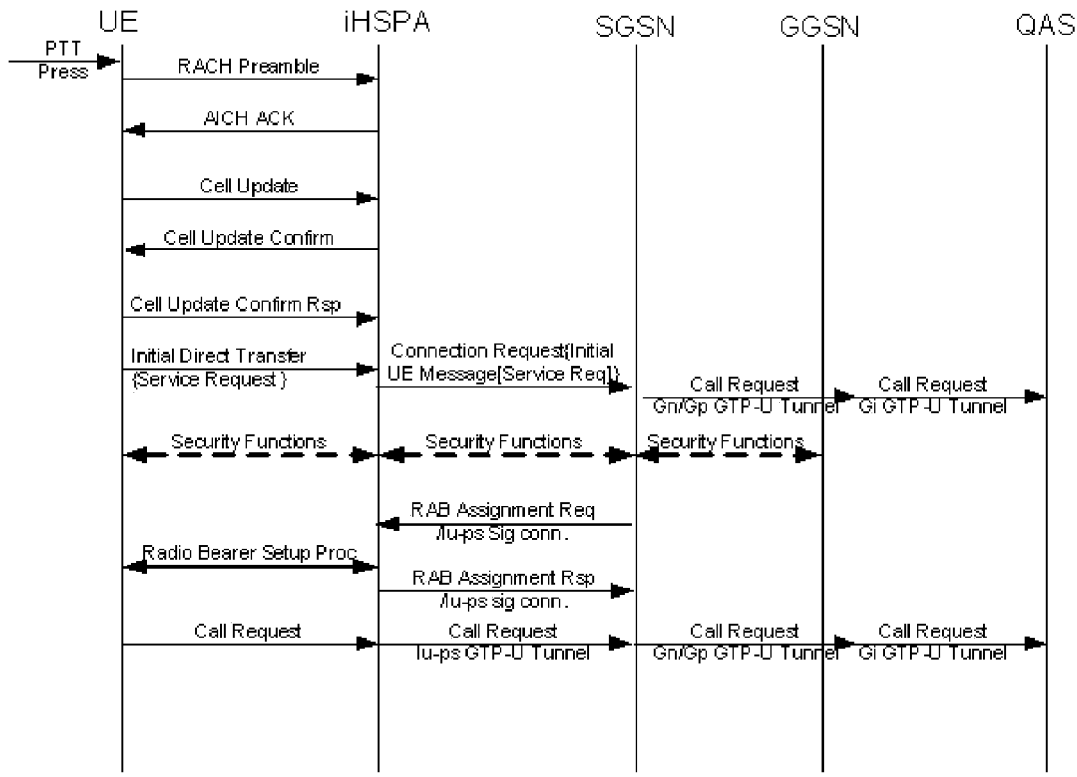
FIG. 14 is a call flow diagram illustrating an example network system that implements techniques for mobile originated sending data over a mobile network for push-to-talk (PTT) call setup.

FIG. 14 depicts a call flow for another example involving call origination in a communication system based on i-HSPA. i-HSPA is a new UMTS Terrestrial Radio Access Network (UTRAN) component introduced to 3GPP, which is a mixture of RNC and Node B in a single box. Under the i-HSPA architecture, maintaining always-on RAB and Iu connection may not be desirable since the wireless device needs to perform SRNS relocation whenever it crosses the cell boundary. For PTT/VoIP, the PDP context of the service must be maintained to receive incoming calls; this implies that the Gn/Gp interface between SGSN and GGSN for the PDP context is kept alive. When the Iu connection is torn down, the wireless device in IDLE or dormant state (URA/CELL_PCH) may need to perform a Service Request (SR) for any uplink data activity (see 3GPP 6.12/TS 23.060). The wireless device in IDLE or dormant state may not be able to transmit data until the Radio Bearer Setup procedure ends.

FIG. 14 shows the call flow for Signaling Procedure for UL Data Transmission under i-HSPA. In an example for sending an application data message over NAS Signaling in i-HSPA, a wireless device may piggyback an initial application data message in the form of a user IP packet in the Service Request (SR) message, in another example of sending an application data message in an SRB channel. After receiving the Service Request, the SGSN forwards the packet to the GGSN over the Gn/Gp interface of the maintained PDP context. In this example, the wireless device may start transmitting an application data message as user plan data along with the SR. The initial user plan data may be encapsulated into the SR message, which in turn is encapsulated into the RRC: Initial Direct Transfer message in the following format: RRC: Initial Direct Transfer{NAS: Service Request (Initial User Plan Data-)}.

An example involving Machine Type Communication (MTC) small data transmissions may involve occasional small packet transmissions which may be sent over UDP in one example, by anywhere up to a potentially extremely large number of MTC-enabled devices. Even if the individual traffic by each MTC device is negligible, the aggregate traffic may be quite burdensome to the network. MTC requirements are addressed in 3GPP Technical Standard 22.368. In this example, an SPDS-enabled system may support transmissions of small amounts of data with a substantially reduced network impact, such as in terms of signaling overhead, network resources, and delay for reallocation, for example. Before transmission of a small amount of data, an MTC device may be attached or detached to or from the network. The definition of a small amount of data with reference to an SPDS system and the one or more thresholds it may use in determining whether to send an MTC application data message via an SRB channel may be configurable per subscription or by network operator policy, for example.

In one example, an RRC ConnectionRequest signal may include an additional establishment cause, with the following format: emergency, highPriorityAccess, mt-Access, mo-Signaling, mo-Data, spare3, spare2, spare1, delayTolerantAccess, delayTolerantSignaling. delayTolerantAccess requires DRB and S1 connections, and exchanges of several messages, such as TCP connection establishment/release messages plus the MTC small data application data messages. delayTolerantSignaling may not require DRB and S1 connections and there may be only one message exchange, MTC Small Data plus an application layer ACK acknowledge message, running over UDP. An eNodeB may accept or reject an RRC connection depending on the requested MTC connection type, as illustrated in FIG. 15.

Figure 15:
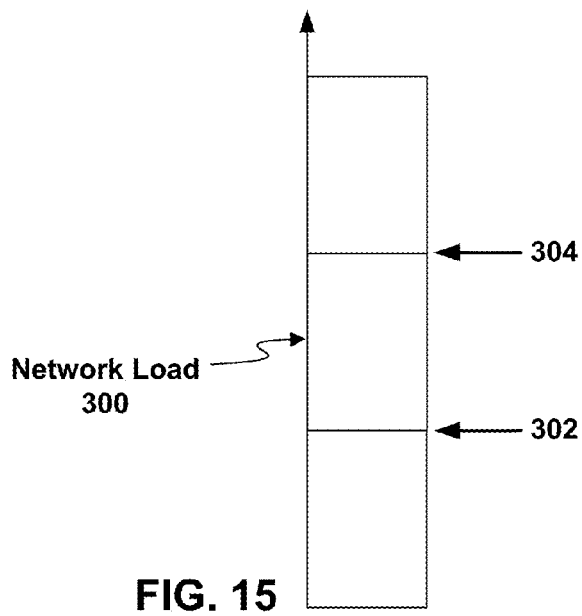
FIG. 15 is a graph of network load showing example thresholds for accepting various RRC connection requests.

FIG. 15 depicts a simple graph of different thresholds applied by an eNodeB for accepting RRC Connection Requests as a function of network load 300. As MTC Small Data over an NAS SRB channel consumes significantly less radio resource compared to MTC Data over a DRB channel, an eNodeB may, in one example, apply different thresholds to different connection requests, such as a more relaxed, higher threshold 304 for RRC connection requests for "delayTolerantSignaling" compared to a lower threshold 302 for "delayTolerantAccess". In one illustrative example, an eNodeB may apply the lower threshold 302 at 30% network load for accepting an RRC Connection Request with delayTolerantAccess, and a higher threshold 304 of 50% network load for accepting an RRC Connection Request with delayTolerantSignaling, though any of a wide range of other thresholds may also be used in other implementations.

In various examples, SPDS-qualifying application data messages may be sent via SRB in modified UL/DL generic NAS Transfer, modified Service Request signals, or any other NAS messages. In various examples, NAS signals may include security by an encrypted information element (IE) in the NAS messages. For example, a modified UL Initial Generic NAS message may contain Security Context ID (eKSI) and sequence number, and MAC-I (Message Authentication Code for Integrity) for integrity protection. In this example, the container type is MTC Small Data. Only the container portion may be encrypted using the security context identified by the eKSI. A modified Service Request message may contain an encrypted IE for an SPDS message. In various examples, a modified Service Request message modified to carry embedded encrypted information may include an APN access point name; different APN for different applications, e.g. MTC APN, VoIP APN; and/or APN in generic NAS message or modified Service Request message. A P-GW may be associated with the APN. An S-GW may read the APN to determine which P-GW to send to. An APN field may be included in a generic NAS message.

An S-GW may determine whether it needs to forward a MT small data packet to an MME by forwarding a received packet from an MME to a P-GW. The S-GW may maintain a relatively short inactivity timer. If a small downlink data packet, e.g., an ACK message, is received before the expiration of the timer, the S-GW may forward the packet to the MME. This may be applied in both MO and MT examples. During the EPS bearer setup for an MTC wireless device, the MME may indicate an MTC APN and small data threshold to the S-GW. When the S-GW receives a small data packet for such wireless devices from a P-GW associated with MTC APN, it may forward the packet to the MME using a new GTPv2-C message instead of sending DL Data Notification.

An MTC device may also sometimes generate large packets. An MTC wireless device may use an SPDS data management module or component that applies an SPDS selection logic to determine whether to send an application data message over an SRB channel or over a DRB channel. The SPDS selection logic may consider any one or more of a variety of criteria, including packet size, frequency, average data rate, delay sensitivity, etc., and may compare any one or more of these values with applicable thresholds. Some examples may simply compare a candidate outgoing application data message with a data size threshold, to determine whether to send the application data message via an SRB channel or a DRB channel.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described that illustrate various aspects without indicating any limitations on the invention. "Various examples" as used herein refer to a subset of examples that are not exclusive of other examples. Any of a variety of variations and combinations of any of the elements disclosed herein may be combined for some additional non-exclusive examples. The examples disclosed above and other examples are within the scope of the following claims.

What is claimed is:

1. A method of transmitting data, the method comprising:
   generating, with a wireless device, a first application data message for a first application;
   evaluating one or more criteria for determining whether to send the first application data message via a data radio bearer (DRB) channel or via a signaling radio bearer (SRB) channel that communicatively couples the wireless device to a network resource;
   based on determining to send the first application data message via the SRB channel, sending the first application data message to the network resource via the SRB channel, wherein the first application message has a data size that is less than a data size threshold;
   generating, with the wireless device, a second application data message for a second application;
   determining that a data size of the second application data message is greater than the data size threshold;
   sending signaling data via the SRB channel to the network resource to establish the DRB channel between the wireless device and the network resource; and
   sending the second application data message via the DRB channel.

2. The method of claim 1, wherein the first application data message comprises one or more application data packets for the first application.

3. The method of claim 1, wherein the first application data message is sent to the network resource via the SRB channel without establishing the DRB channel.

4. The method of claim 1, wherein determining to send the first application data message via the SRB channel comprises determining that the data size of the application data message is less than the data size threshold.

5. The method of claim 1, wherein determining to send the first application data message via the SRB channel comprises determining that a plurality of application data messages that comprise the first application data message have a data transfer rate that is less than a data transfer rate threshold.

6. The method of claim 1, wherein determining to send the first application data message via the SRB channel comprises determining that the application has requested data transmission via the SRB channel and the first application data message satisfies one or more of the criteria for determining whether to send the application data message via the DRB channel or via the SRB channel.

7. The method of claim 1, wherein the first application and the second application are the same application.

8. The method of claim 1, wherein generating the application first data message comprises generating one or more application data packets that each comprise data for the first application, and a header that specifies a mobile identifier associated with the wireless device, and a destination address associated with the first application.

9. The method of claim 8, wherein the mobile identifier associated with the wireless device is one that is known to an application server associated with the first application.

10. The method of claim 8, wherein the destination address associated with the first application comprises an address of an application server associated with the first application, wherein the application server is accessible via a packet data network.

11. The method of claim 8, wherein the destination address associated with the first application comprises an Access Point Name (APN), a Tunnel End Point Identity (TEID), or a combination of APN and TEID.

12. The method of claim 1, further comprising receiving, via the SRB channel, one or more application data packets from an application server associated with the first application.

13. The method of claim 1, wherein the first application data message comprises data for an application in the Application Layer (Layer Seven) of the Open Systems Interconnection (OSI) model.

14. The method of claim 1, wherein sending the first application data message to the network resource via the SRB channel comprises sending the first application data message to a node that communicates data between the wireless device and a mobility management entity (MME) that is enabled to communicate the first application data message directly to a packet data network.

15. The method of claim 1, method further comprising:
   generating, with the wireless device, a third application data message for a third application;
   aggregating the first application data message and the third application data message into an aggregated application data message,
   wherein determining to send the first application data message via the SRB channel comprises determining to send the aggregated application data message via the SRB channel; and
   based on determining to send the aggregated application data message via the SRB channel, sending the aggregated application data message to the network resource via the SRB channel.

16. The method of claim 1, wherein the first application data message comprises a first group of one or more application data messages that the first application requests to send via the SRB channel, the method further comprising:
   generating, with the wireless device, a second group of application data messages that the first application requests to send via the DRB channel; and
   based on the first application's request, sending the second group of application data messages via one or more DRB channels.

17. The method of claim 16, wherein the first group of application data messages comprises push-to-talk (PTT) call setup messages.

18. A wireless device for transmitting data, the wireless device being configured to:
   generate a first application data message for a first application;
   evaluate one or more criteria for determining whether to send the first application data message via a data radio bearer (DRB) channel or via a signaling radio bearer (SRB) channel that communicatively couples the wireless device to a network resource;

based on determining to send the application data message via the SRB channel, send the application data message to the network resource via the SRB channel, wherein the first application message has a data size that is less than a data size threshold;

generate a second application data message for a second application;

determine that a data size of the second application data message is greater than the data size threshold;

send signaling data via the SRB channel to the network resource to establish the DRB channel between the wireless device and the network resource; and send the second application data message via the DRB channel.

19. The wireless device of claim 18, further configured such that the first application data message comprises one or more application data packets for the first application.

20. The wireless device of claim 18, further configured such that the first application data message is sent to the network resource via the SRB channel without establishing the DRB channel.

21. The wireless device of claim 18, further configured such that determining to send the first application data message via the SRB channel comprises determining that the first application data message has a data size that is less than the data size threshold.

22. The wireless device of claim 18, further configured such that determining to send the first application data message via the SRB channel comprises determining that a plurality of application data messages that comprise the first application data message have a data transfer rate that is less than a data transfer rate threshold.

23. The wireless device of claim 18, further configured such that determining to send the first application data message via the SRB channel comprises determining that the first application has requested data transmission via the SRB channel and the first application data message satisfies one or more of the criteria for determining whether to send the first application data message via the DRB channel or via the SRB channel.

24. The wireless device of claim 18, further configured such that the first application and the second application are the same application.

25. The wireless device of claim 18, further configured such that generating the first application data message comprises generating one or more application data packets that each comprise data for the first application, and a header that specifies a mobile identifier associated with the wireless device, and a destination address associated with the first application.

26. The wireless device of claim 25, further configured such that the mobile identifier associated with the wireless device is one that is known to an application server associated with the first application.

27. The wireless device of claim 25, further configured such that the destination address associated with the first application comprises an address of an application server associated with the first application, wherein the application server is accessible via a packet data network.

28. The wireless device of claim 25, further configured such that the destination address associated with the first application comprises an Access Point Name (APN), a Tunnel End Point Identity (TEID), or a combination of APN and TEID.

29. The wireless device of claim 18, further configured to receive, via the SRB channel, one or more application data packets from an application server associated with the first application.

30. The wireless device of claim 18, further configured such that the first application data message comprises data for an application in the Application Layer (Layer Seven) of the Open Systems Interconnection (OSI) model.

31. The wireless device of claim 18, further configured such that sending the first application data message to the network resource via the SRB channel comprises sending the first application data message to a node that communicates data between the wireless device and a mobility management entity (MME) that is enabled to communicate the first application data message directly to a packet data network.

32. The wireless device of claim 18, further configured to:
generate a third application data message for a third application;
aggregate the first application data message and the third application data message into an aggregated application data message,
wherein the device is further configured such that determining to send the first application data message via the SRB channel comprises determining to send the aggregated application data message via the SRB channel; and
based on determining to send the aggregated application data message via the SRB channel, send the aggregated application data message to the network resource via the SRB channel.

33. The wireless device of claim 18, wherein the first application data message comprises a first group of one or more application data messages that the application requests to send via the SRB channel, the wireless device further being configured to:
generate, with the wireless device, a second group of application data messages that the first application requests to send via the DRB channel; and
based on the first application's request, send the second group of application data messages via one or more DRB channels.

34. The wireless device of claim 33, further configured such that the first group of application data messages comprises push-to-talk (PTT) call setup messages.

35. A wireless device for transmitting data, the wireless device comprising:
means for generating a first application data message for a first application;
means for evaluating one or more criteria for determining whether to send the first application data message via a data radio bearer (DRB) channel or via a signaling radio bearer (SRB) channel that communicatively couples the wireless device to a network resource;
means for sending, based on determining to send the application data message via the SRB channel, the application data message to the network resource via the SRB channel, wherein the first application message has a data size that is less than a data size threshold;
means for generating a second application data message for a second application;
means for determining that a data size of the second application data message is greater than the data size threshold;
means for sending signaling data via the SRB channel to the network resource to establish the DRB channel between the wireless device and the network resource; and means for sending the second application data message via the DRB channel.

36. The wireless device of claim 35, wherein the first application data message comprises one or more application data packets for the application.

37. The wireless device of claim 35, wherein the first application data message is sent to the network resource via the SRB channel without establishing the DRB channel.

38. The wireless device of claim 35, wherein determining to send the first application data message via the SRB channel comprises determining that the first application data message has a data size that is less than the data size threshold.

39. The wireless device of claim 35, wherein determining to send the first application data message via the SRB channel comprises determining that a plurality of application data messages that comprise the first application data message have a data transfer rate that is less than a data transfer rate threshold.

40. The wireless device of claim 35, wherein determining to send the first application data message via the SRB channel comprises determining that the first application has requested data transmission via the SRB channel and the first application data message satisfies one or more of the criteria for determining whether to send the first application data message via the DRB channel or via the SRB channel.

41. The wireless device of claim 35, wherein the first application and the second application are the same application.

42. The wireless device of claim 35, wherein the means for generating the first application data message comprises means for generating one or more application data packets that each comprise data for the first application, and a header that specifies a mobile identifier associated with the wireless device, and a destination address associated with the first application.

43. The wireless device of claim 42, wherein the mobile identifier associated with the wireless device is one that is known to an application server associated with the first application.

44. The wireless device of claim 42, wherein the destination address associated with the first application comprises an address of an application server associated with the first application, wherein the application server is accessible via a packet data network.

45. The wireless device of claim 42, wherein the destination address associated with the first application comprises an Access Point Name (APN), a Tunnel End Point Identity (TEID), or a combination of APN and TEID.

46. The wireless device of claim 35, further comprising means for receiving, via the SRB channel, one or more application data packets from an application server associated with the first application.

47. The wireless device of claim 35, wherein the first application data message comprises data for an application in the Application Layer (Layer Seven) of the Open Systems Interconnection (OSI) model.

48. The wireless device of claim 35, wherein the means for sending the first application data message to the network resource via the SRB channel comprises means for sending the first application data message to a node that communicates data between the wireless device and a mobility management entity (MME) that is enabled to communicate the first application data message directly to a packet data network.

49. The wireless device of claim 35, further comprising:
means for generating, with the wireless device, a third application data message for a third application;
means for aggregating the first application data message and the third application data message into an aggregated application data message;
wherein determining to send the first application data message via the SRB channel comprises determining to send the aggregated application data message via the SRB channel; and
based on determining to send the aggregated application data message via the SRB channel, means for sending the aggregated application data message to the network resource via the SRB channel.

50. The wireless device of claim 35, wherein the first application data message comprises a first group of one or more application data messages that the first application requests to send via the SRB channel, the apparatus further comprising:
means for generating a second group of application data messages that the first application requests to send via the DRB channel; and
based on the first application's request, means for sending the second group of application data messages via one or more DRB channels.

51. The wireless device of claim 50, wherein the first group of application data messages comprises push-to-talk (PTT) call setup messages.

52. A computer program product comprising a computer-readable medium having stored thereon computer-executable instructions that, when executed, cause one or more processors of a wireless device to:
generate a first application data message for a first application;
evaluate one or more criteria for determining whether to send the first application data message via a data radio bearer (DRB) channel or via a signaling radio bearer (SRB) channel that communicatively couples the wireless device to a network resource; and
based on determining to send the first application data message via the SRB channel, send the first application data message to the network resource via the SRB channel, wherein the first application message has a data size that is less than a data size threshold;
generate a second application data message for a second application;
determining that a data size of the second application data message is greater than the data size threshold;
send signaling data via the SRB channel to the network resource to establish the DRB channel between the wireless device and the network resource; and
send the second application data message via the DRB channel.

53. The computer program product of claim 52, wherein the instructions further cause the one or more processors to generate the first application data message, such that the first application data message comprises one or more application data packets for the first application.

54. The computer program product of claim 52, wherein the instructions further cause the one or more processors to generate the first application data message, such that the first application data message is sent to the network resource via the SRB channel without establishing the DRB channel.

55. The computer program product of claim 52, wherein the instructions further cause the one or more processors to evaluate the one or more criteria for determining whether to send the first application data message via the DRB channel or via the SRB channel by at least determining that the data size of the first application data message is less than the data size threshold.

56. The computer program product of claim 52, wherein the instructions further cause the one or more processors to evaluate the one or more criteria for determining whether to send the first application data message via the DRB channel or via the SRB channel by at least determining that a plurality of application data messages that comprise the first application data message have a data transfer rate that is less than a data transfer rate threshold.

57. The computer program product of claim 52, wherein the instructions further cause the one or more processors to evaluate the one or more criteria for determining whether to send the first application data message via the DRB channel or via the SRB by at least determining that the first application has requested data transmission via the SRB channel and the first application data message satisfies one or more of the criteria for determining whether to send the first application data message via the DRB channel or via the SRB channel.

58. The computer program product of claim 52, wherein the first application and the second application are the same application.

59. The computer program product of claim 52, wherein the instructions further cause the one or more processors to generate the first application data message such that the one or more application data packets each comprise data for the first application, and a header that specifies a mobile identifier associated with the wireless device, and a destination address associated with the first application.

60. The computer program product of claim 59, wherein the instructions further cause the one or more processors to generate the first application data message such that the mobile identifier associated with the wireless device is one that is known to an application server associated with the first application.

61. The computer program product of claim 59, wherein the instructions further cause the one or more processors to generate the first application data message such that the destination address associated with the first application comprises an address of an application server associated with the first application, wherein the application server is accessible via a packet data network.

62. The computer program product of claim 59, wherein the instructions further cause the one or more processors to generate the first application data message such that the destination address associated with the first application comprises an Access Point Name (APN), a Tunnel End Point Identity (TEID), or a combination of APN and TEID.

63. The computer program product of claim 52, wherein the instructions further cause the one or more processors to receive, via the SRB channel, one or more application data packets from an application server associated with the first application.

64. The computer program product of claim 52, wherein the instructions further cause the one or more processors to generate the first application data message for the first application such that the first application data message comprises data for an application in the Application Layer (Layer Seven) of the Open Systems Interconnection (OSI) model.

65. The computer program product of claim 52, wherein the instructions further configure the one or more processors send the first application data message to the network resource via the SRB channel by at least sending the first application data message to a node that communicates data between the wireless device and a mobility management entity (MME) that is enabled to communicate the first application data message directly to a packet data network.

66. The computer program product of claim 52, wherein the instructions further cause the one or more processors to:
generate a third application data message for a third application;
aggregate the first application data message and the third application data message into an aggregated application data message;
wherein determining to send the first application data message via the SRB channel comprises determining to send the aggregated application data message via the SRB channel; and
based on determining to send the aggregated application data message via the SRB channel, send the aggregated application data message to the network resource via the SRB channel.

67. The computer program product of claim 52, wherein the instructions further configure the one or more processors such that the first application data message comprises a first group of one or more application data messages that the first application requests to send via the SRB channel, and the instructions further cause the one or more processors to:
generate a second group of application data messages that the first application requests to send via the DRB channel; and
based on the first application's request, send the second group of application data messages via one or more DRB channels.

68. The computer program product of claim 52, wherein the instructions further configure the one or more processors such that the first group of application data messages comprises push-to-talk (PTT) call setup messages.

69. A method of transmitting data, the method comprising:
receiving, with a network resource, a first application data message for a first application configured to run on a wireless device;
evaluating one or more criteria for determining whether to send the first application data message via a data radio bearer (DRB) channel or via a signaling radio bearer (SRB) channel that communicatively couples the network resource to the wireless device; and
upon determining to send the first application data message via the SRB channel, sending the first application data message to the wireless device via the SRB channel, wherein the first application message has a data size that is less than a data size threshold;
receiving, with the network resource, a second application data message for a second application;
determining that a data size of the second application data message is greater than the data size threshold;
sending signaling data via the SRB channel to the wireless device to establish the DRB channel between the wireless device and the network resource; and
sending the second application data message via the DRB channel.

70. The method of claim 69, wherein receiving the first application data message for the first application configured to run on a wireless device comprises receiving the first application data message directly from a packet data network through a message exchange protocol.

71. The method of claim 69, wherein receiving the first application data message for the first application configured to run on a wireless device comprises receiving the first application data message in Internet Protocol (IP), the method further comprising translating the first application data message from Internet Protocol to a short message exchange protocol prior to sending the first application data message to the wireless device via the SRB channel.

72. The method of claim 69, wherein the first application data message comprises one or more application data packets for the first application.

73. The method of claim 69, wherein the first application data message is sent to the wireless device via the SRB channel without establishing the DRB channel.

74. The method of claim 69, wherein determining to send the first application data message via the SRB channel comprises determining that the data size of the first application data message is less than the data size threshold.

75. The method of claim 69, wherein determining to send the first application data message via the SRB channel comprises determining that a plurality of application data messages that comprise the first application data message have a data transfer rate that is less than a data transfer rate threshold.

76. The method of claim 69, wherein determining to send the first application data message via the SRB channel comprises determining that the first application has requested data transmission via the SRB channel and the first application data message satisfies one or more of the criteria for determining whether to send the first application data message via the DRB channel or via the SRB channel.

77. The method of claim 69, wherein the first application and the second application are the same application.

78. The method of claim 69, wherein the first application data message comprises data for an application in the Application Layer (Layer Seven) of the Open Systems Interconnection (OSI) model.

79. The method of claim 69, wherein sending the first application data message to the wireless device via the SRB channel comprises sending the first application data message to a node that communicates data between a mobility management entity (MME) and the wireless device, wherein the mobility management entity is enabled to receive the first application data message directly from a packet data network.

80. The method of claim 69, further comprising:
- receiving, with the network resource, a third application data message for a third application;
- aggregating the first application data message and the third application data message into an aggregated application data message;
- wherein determining to send the first application data message via the SRB channel comprises determining to send the aggregated application data message via the SRB channel; and
- upon determining to send the aggregated application data message via the SRB channel, sending the aggregated application data message to the wireless device via the SRB channel.

81. The method of claim 69, wherein the first application data message comprises a first group of one or more application data messages that the first application requests to send via the SRB channel, the method further comprising:
- receiving, with the network resource, a second group of application data messages that the first application requests to send via the DRB channel; and
- based on the first application's request, sending the second group of application data messages via one or more DRB channels.

82. The method of claim 81, wherein the first group of application data messages comprises push-to-talk (PTT) call setup messages.

* * * * *